United States Patent
Gustafsson

(10) Patent No.: US 8,463,464 B2
(45) Date of Patent: Jun. 11, 2013

(54) METHOD AND APPARATUS FOR GENERATING AT LEAST ONE VOTED FLIGHT TRAJECTORY OF A VEHICLE

(75) Inventor: Daniel Gustafsson, Norrköping (SE)

(73) Assignee: SAAB AB, Linköping (SE)

( * ) Notice: Subject to any disclaimer, the term of this patent is extended or adjusted under 35 U.S.C. 154(b) by 665 days.

(21) Appl. No.: 12/251,649

(22) Filed: Oct. 15, 2008

(65) Prior Publication Data

US 2009/0118896 A1 May 7, 2009

(30) Foreign Application Priority Data

Oct. 15, 2007 (EP) ..................................... 07118517

(51) Int. Cl.
*G05D 1/08* (2006.01)
*G08G 5/04* (2006.01)

(52) U.S. Cl.
USPC ..................................... 701/4; 701/3; 701/120

(58) Field of Classification Search
USPC ................. 701/3, 13, 23, 29, 120, 29.3, 32.3, 701/4; 700/47, 248
See application file for complete search history.

(56) References Cited

U.S. PATENT DOCUMENTS

| | | | | |
|---|---|---|---|---|
| 5,043,903 | A * | 8/1991 | Constant | 701/300 |
| 5,521,817 | A * | 5/1996 | Burdoin et al. | 701/3 |
| 6,262,679 | B1 * | 7/2001 | Tran | 342/29 |
| 6,271,768 | B1 * | 8/2001 | Frazier et al. | 340/961 |
| 6,865,517 | B2 * | 3/2005 | Bantz et al. | 702/188 |
| 6,885,340 | B2 * | 4/2005 | Smith et al. | 342/465 |
| 6,926,233 | B1 | 8/2005 | Corcoran, III | |
| 7,024,309 | B2 * | 4/2006 | Doane | 701/301 |
| 7,272,472 | B1 * | 9/2007 | McElreath | 701/3 |
| 7,343,222 | B2 * | 3/2008 | Solomon | 700/245 |
| 7,761,196 | B2 * | 7/2010 | Brandao et al. | 701/9 |
| 7,970,506 | B2 * | 6/2011 | DeMarco et al. | 701/23 |
| 2006/0235584 | A1 * | 10/2006 | Fregene et al. | 701/23 |
| 2010/0121575 | A1 * | 5/2010 | Aldridge et al. | 701/301 |
| 2010/0168937 | A1 * | 7/2010 | Soijer et al. | 701/11 |

OTHER PUBLICATIONS

Mehra, R. et al, "Autonomous formation flying of multiple UCAVs under communication failure", IEEE Position Location and Navigation Symposium, 2000, pp. 371ff.*
Hoover, R. et al., "Hybrid computing techniques for collaborative control of UCAVs", Proceedings of IMECE 2005, Paper 80144.*
Keviczky, T. et al., "Coordinated autonomous vehicle formations: decentralization, control synthesis and optimization", Proceedings of the 2006 American Control Conference, Paper WeC19.2.*
Ieuropean Search Report—Jan. 24, 2008.
Abel et al., The coordination of multiple autonomous systems using information theoretical political science voting models, Proceedings of the 2006 IEEE/SMC International Conference on System of Systems Engineering, 2006.

* cited by examiner

*Primary Examiner* — James Trammell
*Assistant Examiner* — David Testardi
(74) *Attorney, Agent, or Firm* — Venable LLP; Eric J. Franklin

(57) ABSTRACT

A method for generating a voted trajectory of a vehicle in a first vehicle. First trajectory data is received from at least one second vehicle in a receiver in the first vehicle. Trajectory data is calculated in a trajectory calculator in the first vehicle. The calculated trajectory data and the received first trajectory data concern a determined vehicle. The determined vehicle is determined from a group including the first and the second vehicles. The voted trajectory of the determined vehicle by a voting process based on the calculated trajectory data and the received first trajectory data.

13 Claims, 5 Drawing Sheets

| HEADER | |
|---|---|
| ENCRYPTION | ENCRYPTION |
| ENCRYPTION | ENCRYPTION |
| TRACK ANGLE | SPEED |
| FLIGHT PATH ANGLE | LATITUDE |
| LONGITUDE | ALTITUDE |

METHOD AND APPARATUS FOR GENERATING AT LEAST ONE VOTED FLIGHT TRAJECTORY OF A VEHICLE

CROSS-REFERENCE TO RELATED APPLICATIONS

This application claims priority to European patent application 07118517.7 filed 15 Oct. 2007.

FIELD OF THE INVENTION

The invention relates to an apparatus and method for generating flight data of vehicles. In particular, embodiments relate to a redundant method for generating trajectories for unmanned vehicles.

BACKGROUND OF THE INVENTION

In the field of transportation and aviation the usage of unmanned vehicles is increasing tremendously. When handling a group of unmanned vehicles, such as Unmanned Combat Aerial Vehicles (UCAV), within a space the problem with coordination is a big issue. Some functionality to coordinate the travelling routes, such as flight paths, for all unmanned vehicles needs to be present at all times.

There are some traditional ways to solve the coordinated flying of UCAVs, for example, the required coordination functionality may be located in either the ground control station (GCS), a manned vehicle or in a UCAV assigned as the leader. All these alternatives have however a single point of coordination and lacks sufficient reliability in a dynamic combat environment. All UCAVs are lost if the point of coordination is lost, either by communication failure or lost in battle.

Document U.S. Pat. No. 6,926,233 discloses a totally integrated system for automatic formation flight control of multiple vehicles. Course, speed, altitude, turbulence, and look ahead flight plan corrections are then shared and sent to the respective autopilot and/or auto throttle to alter the course to prevent mid air collision. However, if a communication failure occurs the vehicles will travel blind.

There is, thus, a need to provide a method that enhances the way of generating the trajectories for vehicles in a group of vehicles.

SUMMARY OF THE INVENTION

Embodiments of the invention address the above desire of providing a way of determining trajectories.

An embodiment of the invention relates to an apparatus for a first vehicle adapted to generate a voted trajectory of at least one vehicle wherein the apparatus is configured to receive trajectory data from at least one second vehicle related to at least one determined vehicle, the determined vehicle being determined from a group comprising the first and the second vehicles, retrieve a calculated trajectory from calculating trajectory means in the apparatus related to each determined vehicle, and perform a voting process on the received trajectory data and the calculated trajectory for each determined vehicle to generate the voted trajectory of each determined vehicle.

In addition, the determined vehicle may be the first vehicle.

Furthermore, may the apparatus be arranged to receive local data concerning the first vehicle from sensors in the first vehicle and the local data may be used in the calculating means to calculate trajectory of the first vehicle.

The determined vehicle may in an embodiment be at least one second vehicle.

Additionally, the apparatus may be arranged to receive data concerning the at least one second vehicle sent over the air and the data may be used in the calculating means to calculate trajectory of the at least one second vehicle.

In an embodiment is the apparatus arranged to generate a voted trajectory of the first vehicle as well as a voted trajectory of the at least one second vehicle.

The apparatus may further be configured to monitor the at least one second vehicle based on the voted calculated trajectory of the at least one second vehicle.

Furthermore, the apparatus may further be arranged to transmit the calculated trajectory data to the at least one second vehicle.

In an embodiment may the voting process result in any kind of middle value trajectory or average value trajectory, weighted or not weighted, of the calculated and received trajectories.

The invention may further relate to a vehicle comprising an apparatus according to the above, receiving means for receiving data from the at least one different vehicle, and transmitting means to transmit data to external sources.

An embodiment relates to a method for generating at least one voted trajectory of a vehicle in a first vehicle comprising the steps of: receiving first trajectory data from at least one second vehicle in receiver means of the first vehicle, calculating trajectory data in calculation trajectory means in the first vehicle, wherein the calculated trajectory data and the received first trajectory data concerns a determined vehicle, the determined vehicle being determined from a group comprising the first and the second vehicles, and generating the at least one voted trajectory of a vehicle by a voting process based on the calculated trajectory data and the received first trajectory data.

In an embodiment, the method may further comprise the step of: receiving data, such as position data and the like, from sensors arranged at the first vehicle to be used to calculate trajectory data concerning the first vehicle.

In addition, the method may further comprise the step of: receiving data, such as position data and the like, from the at least one second vehicle to be used to calculate trajectory data concerning the at least one second vehicle.

The method may further comprise the step of transmitting the calculated trajectory data to at least one second vehicle.

Additionally, the method may generate a voted trajectory for the first vehicle and a voted trajectory for the second vehicle.

The method may, in an embodiment, further comprise the step of transferring the at least one voted trajectory that concerns the at least one second vehicle to a monitoring process, in order to compare predicted and real position value of the at least one second vehicle.

Furthermore, the method may further comprise the step of transferring the at least one voted trajectory to a control system of the first vehicle.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF EMBODIMENTS

The main principle driving the solution is to use a unanimous consciousness, a functionality common for all unmanned vehicles. This means, that all unmanned vehicles have all relevant information, including what the other group members are doing, planning to do and their environmental perception. There is a need to eliminate the single point where all the coordination has been performed, this to get a good robustness and failure detection.

The solution for this need is to use a distributed system architecture, where all coordination functionality are implemented onboard every vehicle. All functions are executed on each unmanned vehicle deriving control orders for itself as well as the other unmanned vehicles in the group, based on common input information, which is being distributed between them. The decisions are then distributed and voted on to get a unanimous result.

All this adds to robustness, especially against failures. A group of unmanned vehicles will be performing correctly, as long as one unmanned vehicle can calculate the coordinated trajectories and therefore is able to control the vehicles of the group.

Figure 1:
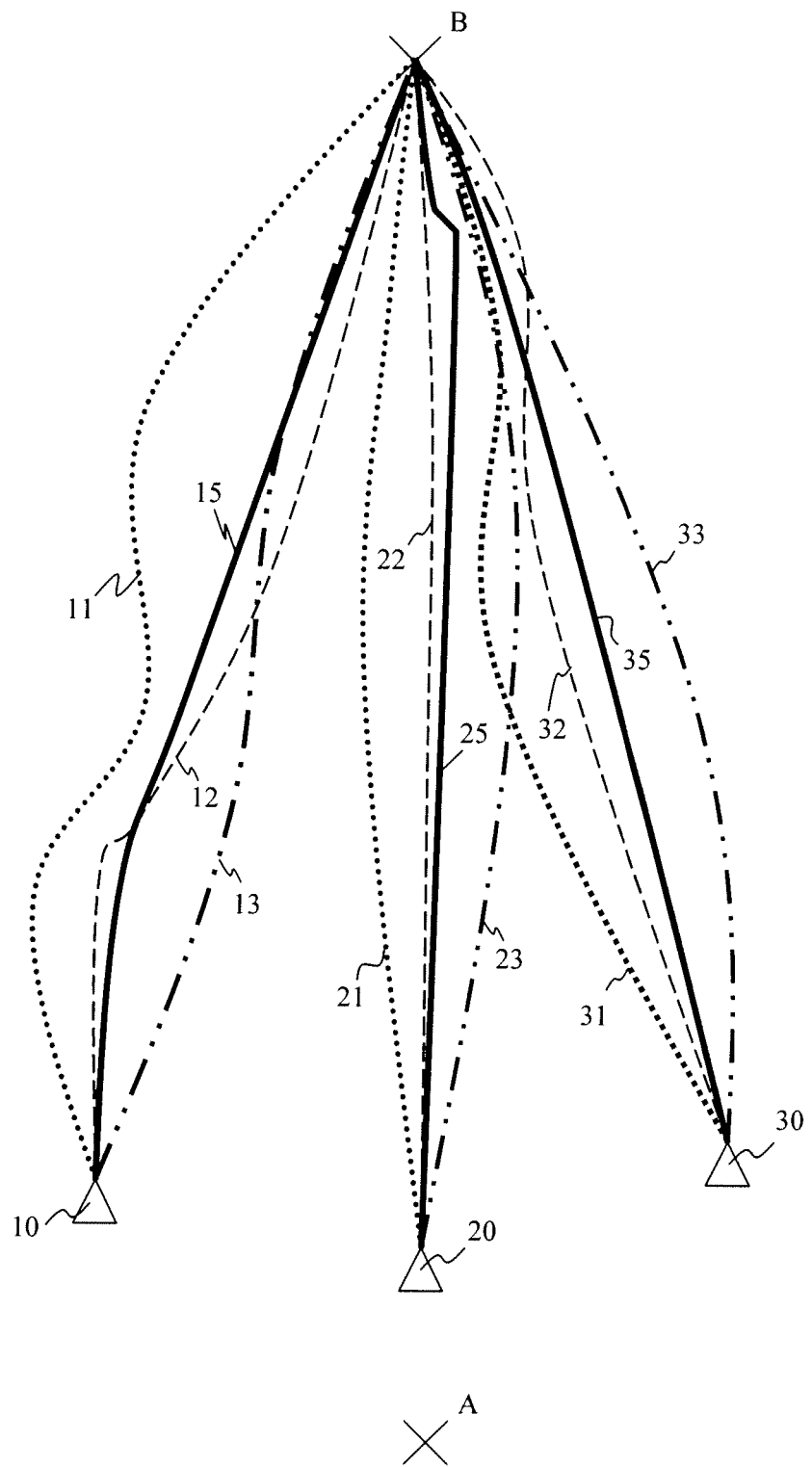
FIG. 1 shows a schematic overview of calculated trajectories of different UAVs.

FIG. 1 shows a schematic overview of three unmanned aerial vehicles, UAV, going from point A to point B. A first UAV 10 has calculated a first trajectory 11 for itself to fly to point B, it has also received a second trajectory 12 from a second UAV 20 and a third trajectory 13 from a third UAV 30. A processor in the first UAV 10 then performs a voting process on the trajectories 11-13 to determine a voted trajectory 15 to follow.

In a similar manner receives the second UAV 20 trajectories 21, 23 from the first UAV 10 and the third UAV 30. A voted trajectory 25 is then determined by performing a voting process on an own calculated trajectory 22 and the received trajectories 21, 23.

In a similar manner receives the third UAV 30 trajectories 31, 32 from the first UAV 10 and the second UAV 20. A voted trajectory 35 is then determined by performing a voting process on an own calculated trajectory 33 and the received trajectories 31, 32.

Furthermore, the first UAV 10 receives the calculated trajectories 22, 32 from the second UAV 20 as well as the calculated trajectories 23 and 33 from the third UAV 30. Hence, the processor in the first UAV has access to all received trajectories 12, 22, 32, 13, 23, 33 and the trajectories calculated internally 11, 21, 31. By performing a voting process, being the same in all UAVs, the first UAV will then know the voted trajectory 25 of the second UAV 20 as well as the voted trajectory 35 of the third UAV 30.

In other words, multiple solutions of trajectories are transferred to each UAV in a group. By knowing the processing of the received trajectories in each UAV as the data is processed in the same way, the different UAVs will be able to determine the planned routes of each UAV.

It should be noted that the UAVs may calculate the trajectories in any known manner.

When a trajectory is sent over the air in a packet the trajectory may be presented for example, by sending a number, such as five hundred, of points indicating the trajectory, an equation with five values, or the like.

Figure 2:
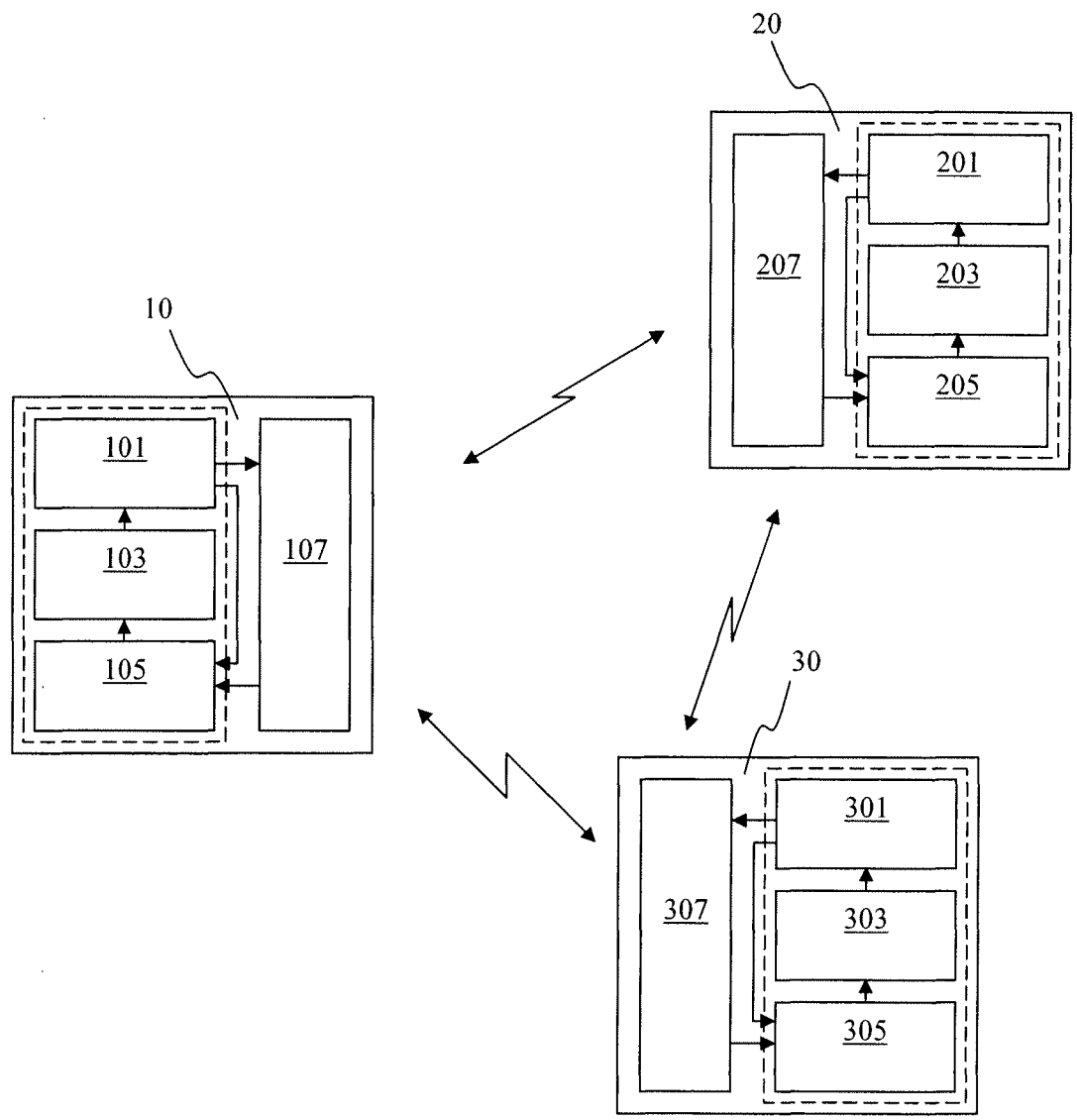
FIG. 2 shows a schematic overview of a plurality of UAVs.

In FIG. 2, a schematic overview of a group of UAVs is shown. The group comprises a first UAV 10, a second UAV 20 and a third UAV 30. In an embodiment the first UAV 10 comprises a transceiver unit 107, trajectory means 101, monitoring means 103, and voting means 105. It should be understood that the UAV may further comprise GPS equipment to determine position, control system to control the UAV, energy source and so on.

The transceiver unit 107 is arranged to receive and transmit data, such as trajectory data, position data of other vehicles and the like.

The trajectory means 101 is arranged to calculate trajectories of itself based on received and stored/measured data, such as GPS data, destination data and the like, and to calculate trajectories of other vehicles based on received data from the transceiver unit 107. These calculations optimize the trajectories for all the vehicles at the same time. Any Global Navigation Satellite System, GNSS, or radio navigation may be used to acquire position data.

Monitoring means 103 is configured to monitor other UAVs and predict positions of the other UAVs.

The voting means 105 is arranged to determine a voted trajectory based on received and calculated trajectories. The voted trajectory for the UAV itself is then transferred to be used in a control system to manoeuvre the UAV and voted trajectories of the other UAVs are transferred to the monitoring unit 103 to be used in a prediction process.

As illustrated in FIG. 2 the UAVs 10, 20, 30 are all in communication with each other, for example, the first UAV 10 is in bidirectional communication with the second UAV 20. The second UAV 20 comprises, similarly to the first UAV 10, a transceiver unit 207 arranged to receive and transmit data, trajectory means 201 for calculating trajectories of itself and/or others based on the received and stored/sensed data, monitoring means 203 arranged to monitor other UAVs and predict positions of the other UAVs, and voting means 205 arranged to determine voted trajectories based on received and calculated trajectories. The voted trajectories are then transferred to and used in a control system of the UAV 20 and/or to the monitoring means 203.

In the same way is the first UAV 10 in communication with the third UAV 30. The third UAV 30 comprises, as the other UAVs, a transceiver unit 307 arranged to receive and transmit data, trajectory means 301 for calculating trajectories of itself and/or others based on the received and stored/measured data, monitoring means 303 arranged to monitor other UAVs and predict positions of the other UAVs, and voting means 305 arranged to determine voted trajectories based on received and calculated trajectories. The voted trajectories are then transferred to and used in a control system of the UAV 30 and/or to the monitoring means 303.

In the illustrated embodiment the second UAV 20 and the third UAV 30 are also in communication with each other It should be understood that the embodiment wherein monitoring of other unmanned vehicles may be used in order to avoid collision when an evasive manoeuvre has to be performed.

As indicated by the dashed lines in the UAVs the process means, that is, calculation, monitoring, voting means may be performed in one microprocessor, however, the processes may be performed by separated microcomputers, processors or the like.

As indicated by the arrows the processes run in a loop as described in more detail below.

In an embodiment a solution formulation may be divided into three parts,
Rules and constraints definitions
Optimization
Distributing and voting The first two parts calculates the trajectories for all unmanned vehicles in the group. The last part in this solution all individual calculations are distributed within the group and then voted on to get a unanimous decision.

The trajectory may consist of, for example, speed, v, travel path angle, Y, and/or track angle, X. The track angle is defined as the aircrafts velocity vector relative to north in the horizontal plane, magnetic or true. The travel path angle is defined as the angle between the aircrafts velocity vector and the horizontal plane. However, any way of implementing a trajectory may be used.

Rules and Constraints Definitions

The rules definition routine states a set of rules dependent on the current flight plan, vehicle status and vehicle constraints. These rules are then used as constraints in the optimization routine. The rules may be defined, for example, as $$\left| (t_t - t) - \frac{dist(p, p_t)}{v_{nom}} \right| \leq T_{window},$$

stating that the UAV (at position, p) must be on next waypoint, $p_t$, within a given time window, $T_{window}$, from time $t_t$ when flying at a nominal speed, $v_{nom}$, and $$\frac{\|p - p_s\|}{d_{range}} \geq 1$$

stating that the minimum distance to a given Surface to Air Missile (SAM) site shall be at least the range of the SAM. In the equation p is UAV position, $p_s$ is SAM position and $d_{range}$ is the defined range of the SAM.

Optimization

An optimization routine then calculates the optimal trajectory from the given rules and constraints, for example, the routine tries to find the optimum flight paths that satisfies the constraints for all vehicles. The optimization algorithm may be, for example, any dynamic programming algorithm, such as a Model Predictive Control algorithm, or a Behaviour Control Lyapunov Function algorithm or the like.

Voting

The concept of the voting is to use unmanned vehicles as nodes in a distributed system that calculates and votes to simulate a unanimous consciousness. One unmanned vehicle calculates the trajectory for itself as well as for all other unmanned vehicles in the group. Then the trajectories are communicated between the unmanned vehicles so that each unmanned vehicle can vote between all calculations performed by the different unmanned vehicles in its own voting logic. The voting is performed on calculations of trajectory calculated in the unmanned vehicles and the calculations of trajectory calculated in other unmanned vehicles transferred to the unmanned vehicle. The voting process may be performed in any known manner. In an example wherein the trajectories are defined as equations a median value voting process may be performed resulting in a median value or a weighted average value process may be performed that results in a weighted average value of all coefficients in the equation.

This embodiment that is a distributed outer loop control system offers great resistance for platform failures. The voting makes the system very failure safe with a lot of redundant information. If one unmanned vehicle loses its ability to calculate it still has several calculated trajectories from the others to perform a voting process on.

Figure 3:
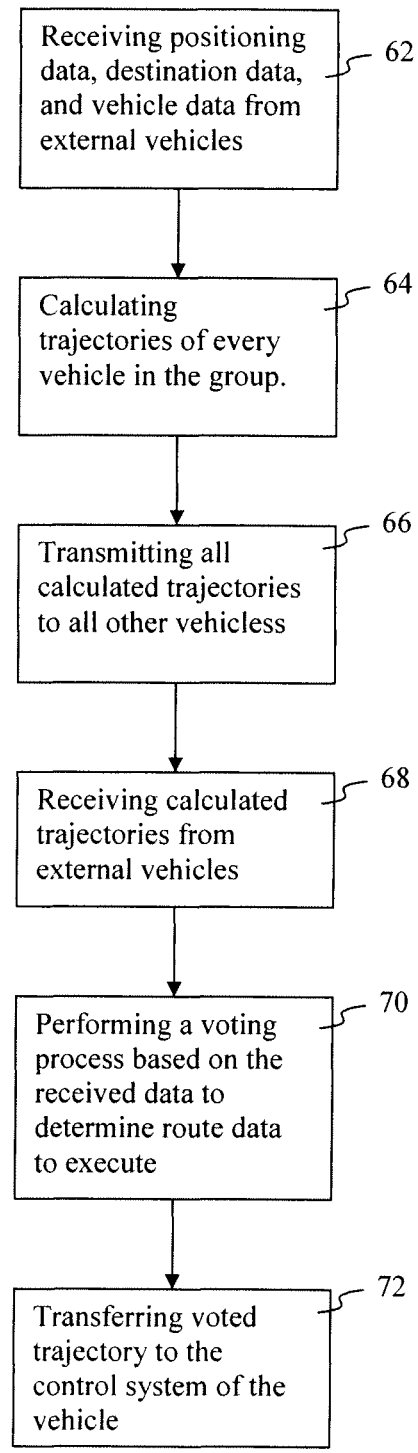
FIG. 3 shows a schematic flow chart of a method for generating a planned trajectory.

In FIG. 3 a schematic overview of a method to generate a voted trajectory is shown.

In step 62, an unmanned vehicle receives data from a group of unmanned vehicles. Packets received may contain positioning data, destination data, vehicle performance data of a transmitting vehicle and the like.

In step 64, the unmanned vehicle calculates trajectories of each unmanned vehicle in the group, including itself, using the data in the received packets and data concerning the vehicle itself from sensors, such as speed sensors, positioning sensors, and the like.

In step 66, the unmanned vehicle transmits the calculated trajectories over the air to the other unmanned vehicles using transceiver means.

In step 68, calculated trajectories are received from the other unmanned vehicles at the transceiver means of the vehicle.

In step 70, a voting process is performed on all the calculated trajectories of the vehicle, that is, the trajectory locally calculated in a processor of the present unmanned vehicle and the calculated trajectories for the vehicle from other unmanned vehicles. The voting process results in a voted trajectory for the unmanned vehicle.

In step 72, the voted trajectory of the vehicle itself is transferred to the control system of the vehicle.

Each unmanned vehicle may also perform voting processes for all other unmanned vehicles, which means that each unmanned vehicle has access to a voted trajectory for each unmanned vehicle in the group. This information may be used to predict future positions of other unmanned vehicles, whereas each vehicle may have a dynamic model for the other vehicles in the group.

Figure 4:
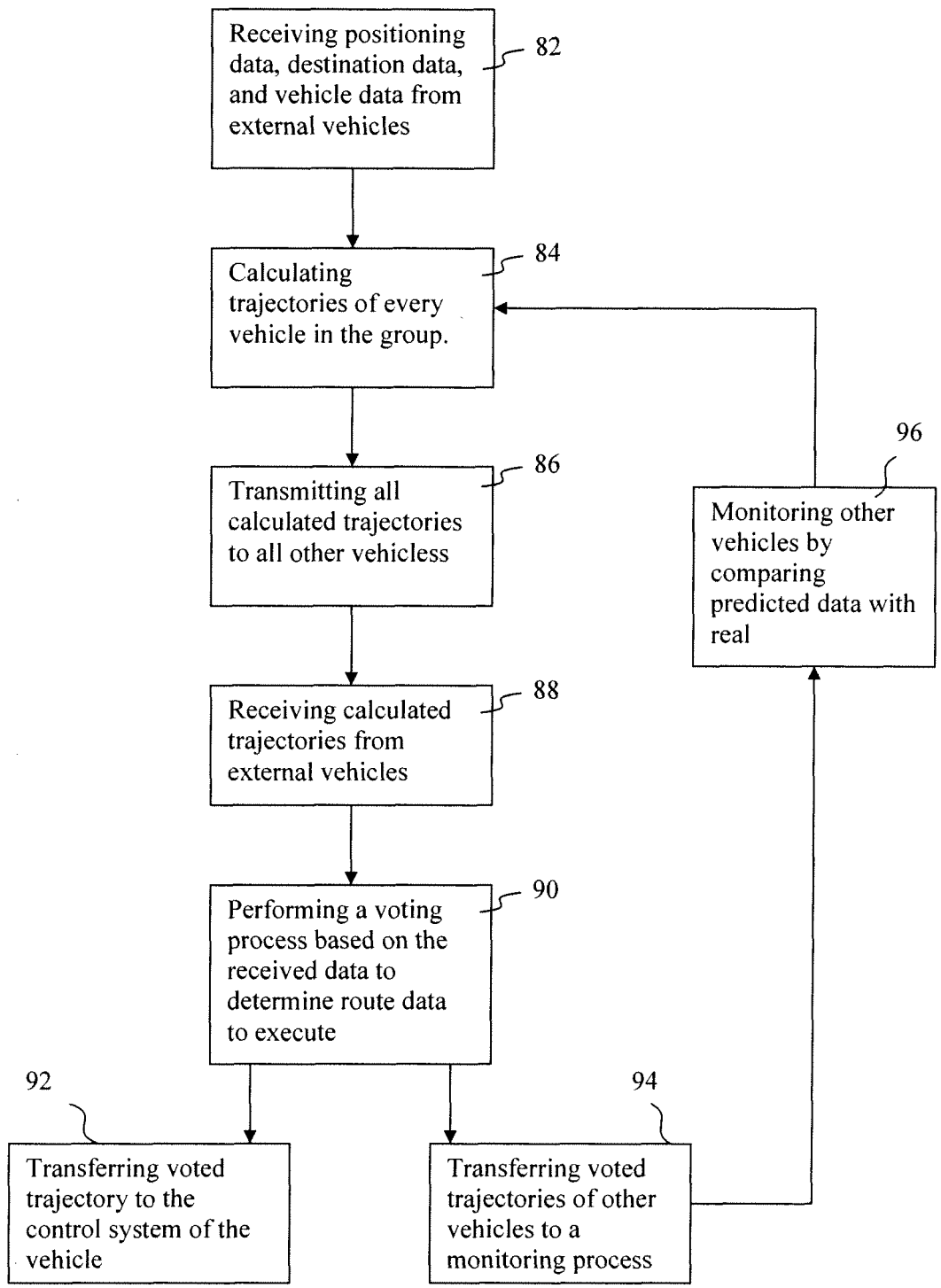
FIG. 4 shows a flow chart of an embodiment of a process undertaken by an unmanned vehicle.

In FIG. 4 a schematic flow chart of a similar process for generating trajectories for vehicles is shown. However, in this embodiment the vehicle also monitors other vehicles in a group.

In step 82, an unmanned vehicle receives data from a group of unmanned vehicle. Packets received may contain positioning data, destination data, and vehicle performance data of the transmitting vehicle.

In step 84, the unmanned vehicle calculates trajectories of each unmanned vehicle in the group, including itself, using the data in the received packets and data concerning the vehicle itself from sensors, such as speed sensors, positioning sensors, and the like.

In step 86, the unmanned vehicle transmits the calculated trajectories over the air to the other unmanned vehicles using transceiver means.

In step 88, calculated trajectories are received from the other unmanned vehicles at the transceiver means of the vehicle.

In step 90, a voting process is performed on all the calculated trajectories for each vehicle, that is, trajectories locally calculated in a processor of the present unmanned vehicle and the calculated trajectories from other unmanned vehicles. The voting process results in a voted trajectory for every unmanned vehicle.

In step 92, the voted trajectory of the vehicle itself is transferred to the control system and used to control the vehicle.

In step 94, the voted trajectory of the other vehicles are transferred to a monitoring process 96, wherein predicted positioning data are transferred back to the calculation process and the process forms an iterative loop process. The predicted value is compared to a real value that is sent from the other vehicles to the vehicle and if the difference is considered to large an error is considered to have occurred.

A prediction may reduce the transfer rate of vehicle status between unmanned vehicles, thereby saving bandwidth. In an embodiment the unmanned vehicles may as a group determine a failure diagnosis of one unmanned vehicle, if the prediction and the real value received from the one unmanned vehicle deviates too much from each other, for example, more than 30 meters.

In an embodiment an unmanned vehicle that loses communication with the other in the group may still calculate its trajectory and predict where the other unmanned vehicles are. This will enable it to perform adequate until it regains contact with the group.

An aspect that needs to be considered is the fact that covertness may be required during certain phases of the mission. The covertness requirement sets constraints on the communication between unmanned vehicles in a group. Since all unmanned vehicles within a group are relatively close to each other the communication links has no requirement for long range. This may be used to decrease the possibility of detection if the data link is constructed so that the maximum range is, for example, much smaller then the current flight altitude. Then the separation of the travel path from the ground will help minimizing the detection possibility.

In an embodiment wherein radio silence is decided and no data communication is possible certain constraints are set to the vehicles ensuring that the unmanned vehicles have non-conflicted space within the space of the group. As an example, this may be done by
- stating that one vehicle shall stay on the left side of the waypoint route and another vehicle on the right side (in case of two vehicle groups).
- setting a requirement that no two unmanned vehicles shall be between two same waypoints at the same time, done by a planner that places a larger amount of waypoints in an area during planning of a mission and thereafter decides on radio silence.

In an embodiment a combination of the two methods may be used.

There are two main things contributing to the bandwidth requirement, the amount of information communicated and the rate of communication. These may be chosen in several different ways with different results.

The amount of data transferred between the unmanned vehicles may vary; some data is not needed as often as other. The position is a variable that may be sent in a lower rate than, for example, flight path parameters, such as track angle, flight path angle, and speed. The algorithm may also be as intelligent that it just sends information that has changed since the last transfer.

Figures 5, 6:
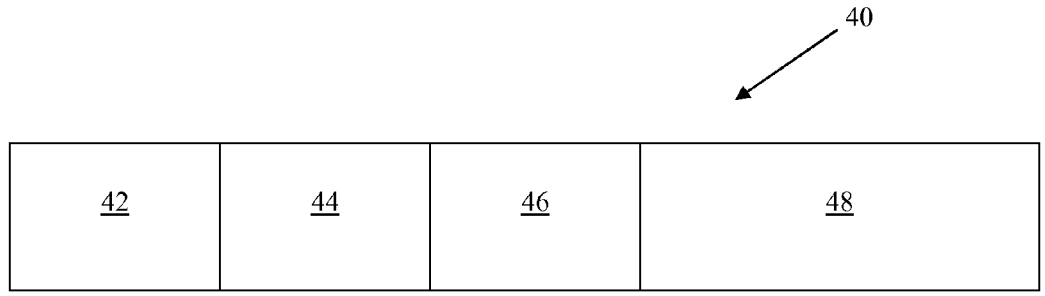
FIG. 5 shows an embodiment of a header of a data packet.
FIG. 6 shows an embodiment of a packet containing data for a trajectory calculation.

In FIGS. 5 and 6 schematic overviews of message packets or parts of packets are shown. Each message transferred may contain a header 40, shown in FIG. 5, containing a sender ID 42, a timestamp 44, message ID 46 and a checksum 48, and an encryption key, as shown in FIG. 6. As shown in FIG. 6 an example of a packet transferred to a UAV containing data to calculate a trajectory is shown, The packet may include a header, encryption sections, and vehicle data such as track angle, speed, flight path angle, altitude, longitude, latitude. As an example, the amount of information that may be sent is header 56 bits, encryption 128 bits, track angle 32 bits, speed 32 bits, flight path angle 32 bits and position 3×32 bits. This sets the total bandwidth requirement of 365 kbits/s in a group of 8 unmanned vehicles and with a communication frequency of 15 Hz.

The rate of communication may be affected by outer circumstances as covertness and waypoint structure. If there is a requirement that the unmanned vehicles shall fly with as little communication as possible then the initial set rate of, for example, 15 Hz cannot be met. Also if the group flies on a very straight waypoint path then the need for updating track angle and speed may decrease. This may be preplanned or be decided in real time in the algorithm from the change in the variables between each iteration.

It should be noted that in an embodiment a UAV that diverge a lot from the planned trajectory may send out a warning to the other UAVs and the other UAVs may perform evasive actions and then a new calculation process will be initiated.

In an embodiment a UAV is forced to take a certain trajectory in order to avoid a threat or the like. The certain trajectory is determined based on the calculations of the trajectories of the other UAVs in order to avoid collision. However, the certain trajectory is set and unknown for the other UAVs so the other UAVs must perform a new voting process on the trajectories of the other UAVs taken the certain trajectory into consideration. Hence, new positioning data is sent as well as trajectory data, such as a plurality of points or an equation.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. An apparatus for a first vehicle adapted to generate a voted trajectory of at least one vehicle, the apparatus comprising:
- a receiver configured to receive vehicle data from at least one second vehicle, the vehicle data concerning the at least one second vehicle, the vehicle data comprising at least one of track angle, speed, flight path angle, altitude, longitude, and latitude, and to receive trajectory data, the trajectory data comprising calculated trajectories of the first vehicle and the at least one second vehicle, the calculated trajectories being calculated at the at least one second vehicle;
- a trajectory calculator configured to calculate the trajectories of the first vehicle and the at least one second vehicle at the first vehicle, based on local vehicle data concerning the first vehicle and based on the received vehicle data concerning the at least one second vehicle;
- a voting module configured to perform a voting process on the received trajectory data calculated at the at least one second vehicle and the calculated trajectory for the first vehicle and the at least one second vehicle calculated at the first vehicle to generate voted trajectories of each of the first vehicle and the at least one second vehicle; and
- a transmitter configured to transmit the trajectories calculated at the first vehicle to the at least one second vehicle and to transmit the local data concerning the first vehicle to the at least one second vehicle.

2. The apparatus according to claim 1, wherein the trajectory calculator is arranged to receive local data concerning the first vehicle from sensors in the first vehicle, and wherein trajectory calculator uses the local data to calculate the trajectory of the first vehicle.

3. The apparatus according to claim 1, wherein the apparatus is further configured to monitor the at least one second vehicle based on the voted calculated trajectory of the at least one second vehicle.

4. The apparatus according to claim 1, wherein the voting process results in a middle trajectory or average trajectory, weighted or not weighted, of the trajectories calculated at the first vehicle and calculated trajectories received from the at least one second vehicle.

5. The apparatus according to claim 1, wherein the calculated trajectories comprise a plurality of points or an equation.

6. A vehicle, comprising:
a receiver configured to receive vehicle data from at least one other vehicle, the vehicle data concerning the at least one other vehicle, the vehicle data comprising at least one of track angle, speed, flight path angle, altitude, longitude, and latitude, and to receive trajectory data, the trajectory data comprising calculated trajectories of the vehicle and the at least one other vehicle, the calculated trajectories being calculated at the at least one other vehicle;
an apparatus comprising a trajectory calculator configured to calculate the trajectories of the vehicle and the at least one other vehicle, based on local vehicle data concerning the vehicle and based on the received vehicle data concerning the at least one other vehicle, the apparatus further comprising a voting module configured to perform a voting process on the received trajectory data calculated at the at least one other vehicle and the calculated trajectory for the vehicle and the at least one other vehicle calculated at the vehicle to generate voted trajectories of each of the vehicle and the at least one other vehicle, and
a transmitter configured to transmit the trajectories calculated at the first vehicle to the at least one other vehicle and to transmit the local data concerning the first vehicle to the at least one other vehicle.

7. The apparatus according to claim 6, wherein the calculated trajectories comprise a plurality of points or an equation.

8. A method for generating in a first vehicle voted trajectories of the first vehicle and at least one second vehicle, the method comprising:
receiving vehicle data from at least one second vehicle in a receiver of the first vehicle, the vehicle data concerning the at least one second vehicle, the vehicle data comprising at least one of track angle, speed, flight path angle, altitude, longitude, and latitude, and receiving trajectory data, the trajectory data comprising calculated trajectories of the first vehicle and the at least one second vehicle, the calculated trajectories being calculated at the at least one second vehicle calculating the trajectories of the first vehicle and the at least one second vehicle, based on local vehicle data concerning the first vehicle and based on the received vehicle data concerning the at least one second vehicle, respectively;
generating, via a processor, the voted trajectories of each of the first vehicle and the at least one second vehicle by a voting process based on the received trajectory data calculated at the at least one second vehicle and the calculated trajectory for the first and the at least one second vehicle calculated at the first vehicle; and
transmitting the trajectories calculated at the first vehicle to the at least one second vehicle and transmitting the local data concerning the first vehicle to the at least one second vehicle.

9. The method according to claim 8, further comprising:
receiving data from sensors arranged at the first vehicle to be used to calculate trajectory data concerning the first vehicle.

10. The method according to claim 8, further comprising:
transferring the at least one voted trajectory that concerns the at least one second vehicle to a monitoring process, in order to compare predicted and real position value of the at least one second vehicle.

11. The method according to claim 8, further comprising:
transferring the at least one voted trajectory to a control system of the first vehicle.

12. The method according to claim 8, wherein the calculated trajectories comprise a plurality of points or an equation.

13. A system, comprising:
at least two vehicles, wherein each vehicle comprises
a receiver configured to receive trajectory data related to an own vehicle and at least one other vehicle, and to receive vehicle data concerning the at least one other vehicle comprising at least one of track angle, speed, flight path angle, altitude, longitude, and latitude, the trajectory data comprising trajectories of the own vehicle and the at least one other vehicle calculated at the at least one other vehicle,
a trajectory calculator configured to calculate a trajectory of the own vehicle and at least one other vehicle based on local vehicle data concerning the own vehicle and based on the received vehicle data concerning the at least one other vehicle,
a voting module configured to perform a voting process on the received trajectory data calculated at the at least one other vehicle and the calculated trajectory for the own vehicle and the at least one other vehicle calculated at the own vehicle to generate voted trajectories of each of the own vehicle and the at least one other vehicle
a transmitter configured to transmit the trajectories calculated at the own vehicle to the at least one other vehicle and to transmit the local vehicle data concerning the own vehicle to the at least one other vehicle.

* * * * *

UNITED STATES PATENT AND TRADEMARK OFFICE
CERTIFICATE OF CORRECTION

PATENT NO. : 8,463,464 B2  
APPLICATION NO. : 12/251649  
DATED : June 11, 2013  
INVENTOR(S) : Gustafsson Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this  
Third Day of March, 2015

Michelle K. Lee  
*Deputy Director of the United States Patent and Trademark Office*